United States Patent
Toyosaki et al.

(10) Patent No.: US 12,456,487 B1
(45) Date of Patent: Oct. 28, 2025

(54) MAGNETIC DISK DEVICE AND METHOD

(71) Applicants: Kabushiki Kaisha Toshiba, Tokyo (JP); Toshiba Electronic Devices & Storage Corporation, Tokyo (JP)

(72) Inventors: Tatsuhiko Toyosaki, Yokohama Kanagawa (JP); Takao Furuhashi, Kawasaki Kanagawa (JP); Kaori Kimura, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/912,217

(22) Filed: Oct. 10, 2024

(30) Foreign Application Priority Data

Jun. 17, 2024 (JP) ................................. 2024-097158

(51) Int. Cl.
*G11B 5/596* (2006.01)
*G11B 20/18* (2006.01)
*G11B 5/00* (2006.01)

(52) U.S. Cl.
CPC .......... *G11B 5/59627* (2013.01); *G11B 20/18* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,247,254 A * | 9/1993 | Huber | G11B 19/04 |
| 7,839,588 B1 * | 11/2010 | Dang | G11B 27/36 |
| | | | 360/53 |
| 8,593,915 B2 | 11/2013 | Schreck et al. | |
| 8,773,957 B1 * | 7/2014 | Champion | G11B 20/182 |
| | | | 369/13.02 |
| 8,787,125 B1 | 7/2014 | Lee | |
| 9,171,575 B1 * | 10/2015 | Alex | G11B 27/36 |
| 9,620,162 B1 | 4/2017 | Haralson | |
| 9,858,953 B1 | 1/2018 | Johnson | |
| 10,410,660 B1 | 9/2019 | Hutchinson et al. | |
| 2001/0036032 A1 * | 11/2001 | Fukushima | G11B 5/59627 |
| | | | 360/77.02 |
| 2005/0168863 A1 * | 8/2005 | Sakai | G11B 5/59627 |
| | | | 360/77.04 |

(Continued)

*Primary Examiner* — Peter Vincent Agustin
(74) *Attorney, Agent, or Firm* — Kim & Stewart LLP

(57) ABSTRACT

A magnetic disk device includes a magnetic disk to which positional information for each track is written, an assist mechanism that heats the magnetic disk, a magnetic head that performs data reading and data writing on the magnetic disk, and a controller that controls the magnetic disk device. The controller is configured to cause the magnetic head to read the positional information written to the magnetic disk to learn a correction amount of a positional deviation generated in synchronization with rotation of the magnetic disk, in parallel with reading the positional information, cause, while supplying assist power to the assist mechanism to heat a learning target portion of the magnetic disk, the magnetic head to write a data pattern used for detection of a defective portion of the magnetic disk, and while supplying the assist power to the assist mechanism to heat a writing target portion of the correction amount of the magnetic disk, cause the magnetic head to write the learned correction amount to the magnetic disk.

8 Claims, 4 Drawing Sheets

(56) References Cited

U.S. PATENT DOCUMENTS

| | | | |
|---|---|---|---|
| 2006/0209443 A1* | 9/2006 | Yamazaki | G11B 20/182 |
| 2007/0074087 A1* | 3/2007 | Lo | G11B 20/18 |
| 2008/0002280 A1* | 1/2008 | Asakura | G11B 5/59627 360/76 |
| 2017/0221511 A1 | 8/2017 | Dai et al. | |
| 2017/0263275 A1* | 9/2017 | Tagami | G11B 20/1217 |
| 2019/0279349 A1* | 9/2019 | Morino | G06T 7/11 |
| 2020/0090686 A1 | 3/2020 | Hutchinson et al. | |
| 2020/0265865 A1 | 8/2020 | Hutchinson et al. | |
| 2020/0365183 A1* | 11/2020 | Matsumoto | G11B 20/1803 |
| 2024/0105225 A1* | 3/2024 | Suzuki | G11B 5/59627 |

* cited by examiner

MAGNETIC DISK DEVICE AND METHOD

CROSS-REFERENCE TO RELATED APPLICATIONS

This application is based upon and claims the benefit of priority from Japanese Patent Application No. 2024-097158, filed on Jun. 17, 2024; the entire contents of which are incorporated herein by reference.

FIELD

Embodiments described herein relate generally to a magnetic disk device and a method.

BACKGROUND

In a magnetic disk device in which data writing is performed by a thermal assist method, it may take time until the quality of data writing is stabilized. In addition, at the time of manufacturing the magnetic disk device, a process of learning the correction amount of a positional deviation generated in synchronization with the rotation of a magnetic disk and writing the learned correction amount to the magnetic disk may be performed. In this case, a problem is to improve the quality of the learned correction amount at the beginning of start of writing.

DETAILED DESCRIPTION

A magnetic disk device according to an embodiment is a magnetic disk device in which data writing is performed by a thermal assist method, the magnetic disk device including: a magnetic disk to which positional information for each track is written; an assist mechanism that heats the magnetic disk; a magnetic head that performs data reading and data writing on the magnetic disk; and a controller that controls the magnetic disk device, in which the controller is configured to cause the magnetic head to read the positional information written to the magnetic disk to learn a correction amount of a positional deviation generated in synchronization with rotation of the magnetic disk, in parallel with reading the positional information, cause, while supplying assist power to the assist mechanism to heat a learning target portion of the magnetic disk, the magnetic head to write a data pattern used for detection of a defective portion of the magnetic disk, and while supplying the assist power to the assist mechanism to heat a writing target portion of the correction amount of the magnetic disk, cause the magnetic head to write the learned correction amount to the magnetic disk.

Hereinafter, embodiments of the present invention will be described in detail with reference to the drawings. Note that the present invention is not limited by the following embodiments. In addition, constituent elements in the following embodiments include those that can be easily assumed by those skilled in the art or those that are substantially the same.

(Configuration Example of Magnetic Disk Device)

Figure 1:
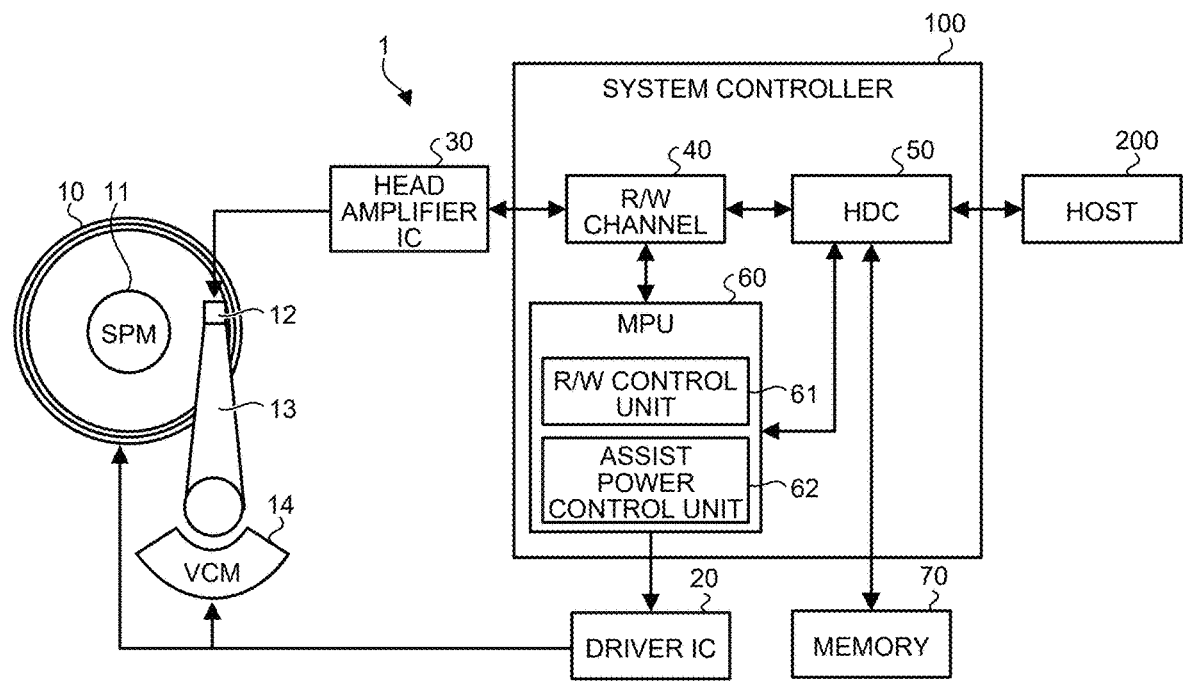
FIG. 1 is a schematic diagram illustrating an example of a configuration of a magnetic disk device according to an embodiment.

FIG. 1 is a schematic diagram illustrating an example of a configuration of a magnetic disk device 1 according to an embodiment. The magnetic disk device 1 of the embodiment is configured as, for example, a hard disk drive (HDD). However, the magnetic disk device 1 of the embodiment may be another magnetic disk device such as a hybrid HDD.

As illustrated in FIG. 1, the magnetic disk device 1 of the embodiment includes a magnetic disk 10, a spindle motor (SPM) 11, a magnetic head 12, an arm 13, a voice coil motor (VCM) 14, a driver integrated circuit (IC) 20, a head amplifier IC 30, a memory 70, and a system controller 100.

The spindle motor 11 holds the magnetic disk 10 and rotates the magnetic disk 10 around a spindle (not illustrated). A recording layer capable of recording data is formed on the magnetic disk 10. More specifically, the magnetic disk 10 is provided with a plurality of concentric tracks centered on the center of rotation by the spindle motor 11, and data and the like can be written to these tracks.

The magnetic head 12 is mounted on the distal end of the arm 13. The arm 13 moves the magnetic head 12 to a predetermined position of the magnetic disk 10 by driving the voice coil motor 14 connected to the other end. As a result, the magnetic head 12 can be brought close to a recording surface of the magnetic disk 10 so as to be accessible. That is, the magnetic head 12 can thereby record (write) data and reproduce (read) data on the recording surface of the magnetic disk 10.

Note that the magnetic disk device 1 may include a plurality of magnetic disks 10 held in parallel in the longitudinal direction by the spindle motor 11, and the recording surface of the magnetic disk 10 may be provided on both surfaces of the magnetic disk 10, for example. In this case, the magnetic disk device 1 may include a plurality of magnetic heads 12 such that the number of magnetic heads 12 corresponds to the number of recording surfaces of the magnetic disk 10.

The system controller 100 is realized by using, for example, a large scale integration (LSI) called a system-on-chip (SoC) in which a plurality of elements are integrated on a single chip. The system controller 100 is connected to a host 200 and controls the entire magnetic disk device 1 on the basis of a command from the host 200. The host 200 is configured as, for example, a processor, a personal computer, or a server.

The system controller 100 includes a read/write (R/W) channel 40, a hard disk controller (HDC) 50, and a micro processing unit (MPU) 60.

The R/W channel 40, the HDC 50, and the MPU 60 are electrically connected to each other, and the system controller 100 is electrically connected to the driver IC 20, the head amplifier IC 30, and the memory 70.

The R/W channel 40 is a signal processing circuit that processes a signal related to read/write. The R/W channel 40 includes a read channel for executing signal processing of read data and a write channel for executing signal processing of write data. The read channel converts a read signal into digital data and demodulates read data from the digital data. The write channel encodes write data transferred from the HDC 50 and transfers the encoded write data to the head amplifier IC 30.

The HDC 50 constitutes an interface between the magnetic disk device 1 and the host 200, and executes transfer control of read data and write data. That is, the HDC 50 functions as a host interface controller that transmits and receives signals to and from the host 200. Examples of the signals transferred from the host 200 include commands such as a write command and a read command. The HDC 50 transmits these commands received from the host 200 to the MPU 60.

As described above, in response to various instructions from the host 200, the HDC 50 controls writing of data to the magnetic disk 10 and reading of data from the magnetic disk 10 via the magnetic head 12, the head amplifier IC 30, the R/W channel 40, and the MPU 60.

The MPU 60 as a control unit is a main controller of the magnetic disk device 1, and includes a read/write (R/W) control unit 61 and an assist power control unit 62. The MPU 60 executes processing by the R/W control unit 61, the assist power control unit 62, and the like on firmware. Note that the MPU 60 may include the R/W control unit 61 and the assist power control unit 62 as circuits.

The R/W control unit 61 controls write processing and read processing of data in accordance with a command or the like from the host 200. More specifically, for example, in a case where a write command is received from the host 200, the R/W control unit 61 executes write processing for writing data to a predetermined region of the magnetic disk 10. In addition, for example, in a case where a read command is received from the host 200, the R/W control unit 61 executes read processing for reading data from a predetermined region of the magnetic disk 10.

At this time, the R/W control unit 61 controls the VCM 14 via the driver IC 20, positions the magnetic head 12 at a target position of the magnetic disk 10, and executes the write processing or the read processing.

Here, the magnetic disk device 1 of the embodiment performs the write processing of data by, for example, a thermal assist method. In the thermal assist method, writing to a medium having high thermal magnetic stability is enabled by heating a writing region of the magnetic disk 10 having a high bit density. The writing region is heated by, for example, near-field light obtained by converting laser light. The magnetic head 12 described above is provided with a near-field light generation element that converts laser light into near-field light.

The assist power control unit 162 controls the head amplifier IC 30 so as to supply assist power to a configuration including the near-field light generation element provided in the magnetic head 12.

The driver IC 20 controls driving of the spindle motor 11 and the voice coil motor 14 according to control of the MPU 60. When the spindle motor 11 is driven, the magnetic disk 10 held by the spindle motor 11 rotates as described above. When the voice coil motor 14 is driven, the magnetic head 12 is positioned at a target track on the magnetic disk 10.

The head amplifier IC 30 supplies a write signal corresponding to the write data supplied from the R/W channel 40 to the magnetic head 12. In addition, the head amplifier IC 30 controls output of the laser light emitted to the near-field light generation element of the magnetic head 12 according to an instruction from the assist power control unit 162. In addition, the head amplifier IC 30 amplifies the read signal output from the magnetic head 12 and transmits the amplified read signal to the R/W channel 40.

The memory 70 includes a volatile memory and a non-volatile memory. As an example, the memory 70 includes a buffer memory including a dynamic random access memory (DRAM), and a flash memory.

(Configuration Example of Magnetic Head)

Figure 2:
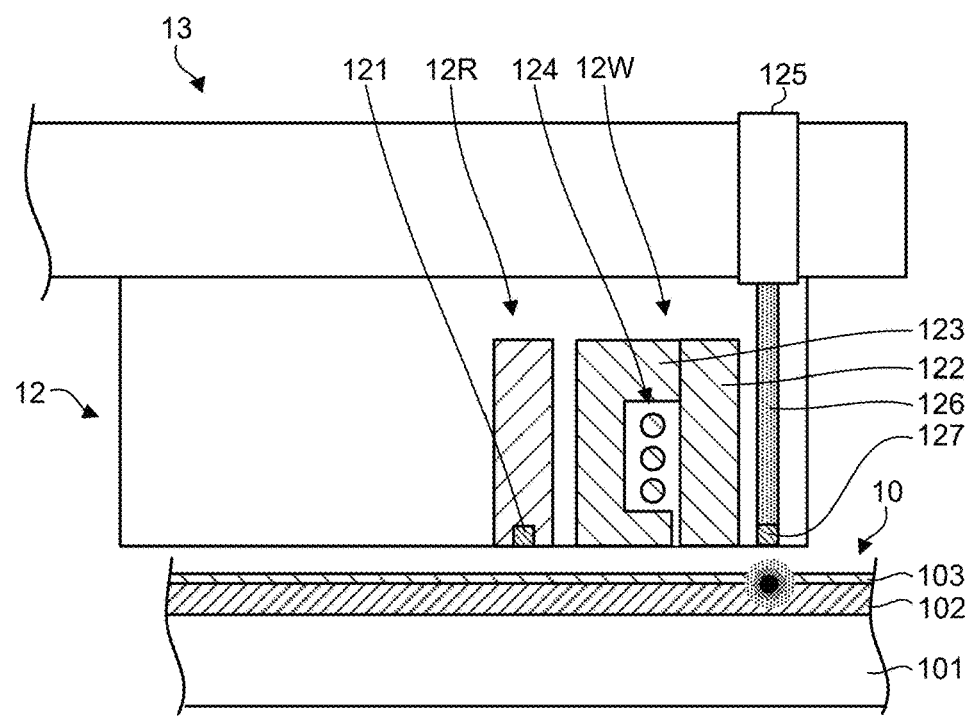
FIG. 2 is a schematic diagram illustrating an example of a configuration of a magnetic head according to the embodiment.

FIG. 2 is a schematic diagram illustrating an example of a configuration of the magnetic head 12 according to the embodiment. As illustrated in FIG. 2, the magnetic head 12 is held by the arm 13 so as to face a recording layer 102 of the magnetic disk 10, and includes a write head 12W and a read head 12R.

The read head 12R includes a read element 121 that reads data from the recording layer 102 provided on a substrate 101 of the magnetic disk 10.

The write head 12W includes a main magnetic pole 122, an auxiliary magnetic pole 123, a coil 124, a laser diode 125, a waveguide 126, and a near-field light generation element 127.

The main magnetic pole 122 is made of a high-permeability material, and generates a perpendicular magnetic field with respect to the recording layer 102 coated with a lubricant 103 in the magnetic disk 10. The auxiliary magnetic pole 123 is magnetically joined to the main magnetic pole 122 and causes a magnetic flux to flow to the main magnetic pole 122. The coil 124 is wound around the auxiliary magnetic pole 123 and causes a magnetic flux to flow to the main magnetic pole 122. In this manner, by generating a magnetic field in the main magnetic pole 122 by the coil 124, data can be written to the recording layer 102 of the magnetic disk 10.

The laser diode 125 is provided, for example, in the arm 13, and emits laser light toward the near-field light generation element 127 below. The waveguide 126 is provided between the laser diode 125 and the near-field light generation element 127, and guides the laser light emitted from the laser diode 125 to the near-field light generation element 127. The near-field light generation element 127 converts the laser light from the laser diode 125 into near-field light, and irradiates the recording layer 102 of the magnetic disk 10 with the near-field light.

The near-field light is localized light generated in the vicinity of a microstructure equal to or less than an optical wavelength, and a light spot diameter of the near-field light is determined by a dimension of the microstructure without depending on the optical wavelength. By using the near-field light, a minute light spot can be generated, and a minute local region of the magnetic disk 10 can be heated.

As described above, a recording medium having high magnetic stability is used for the recording layer 102 of the magnetic disk 10 in order to increase the bit density. By heating a minute writing region of the recording layer 102 at the time of writing data, the coercive force of the recording medium having high magnetic stability as described above is temporarily weakened, and data can be written to the magnetic disk 10. Note that a heating mechanism to heat the magnetic disk 10 is able to construct different from the above structures.

(Configuration Example of Magnetic Disk)

In a manufacturing process, servo data used for positioning the magnetic head 12 is written to the magnetic disk 10. User data received from the host 200, metadata such as an error correction code attached to the user data, system data, and the like can be written in each track region except for a region where the servo data is written.

The magnetic disk device 1 holds setting of positional relationships between a plurality of servo tracks and a plurality of data tracks in advance. As a result, the magnetic disk device 1 can execute positioning control for positioning the magnetic head 12 in a target data track on the basis of the servo data recorded in each servo track. The positioning control includes a seek operation of moving the magnetic head 12 in a radial direction toward the target data track and a tracking operation of maintaining the magnetic head 12 on the target data track.

Figure 3:
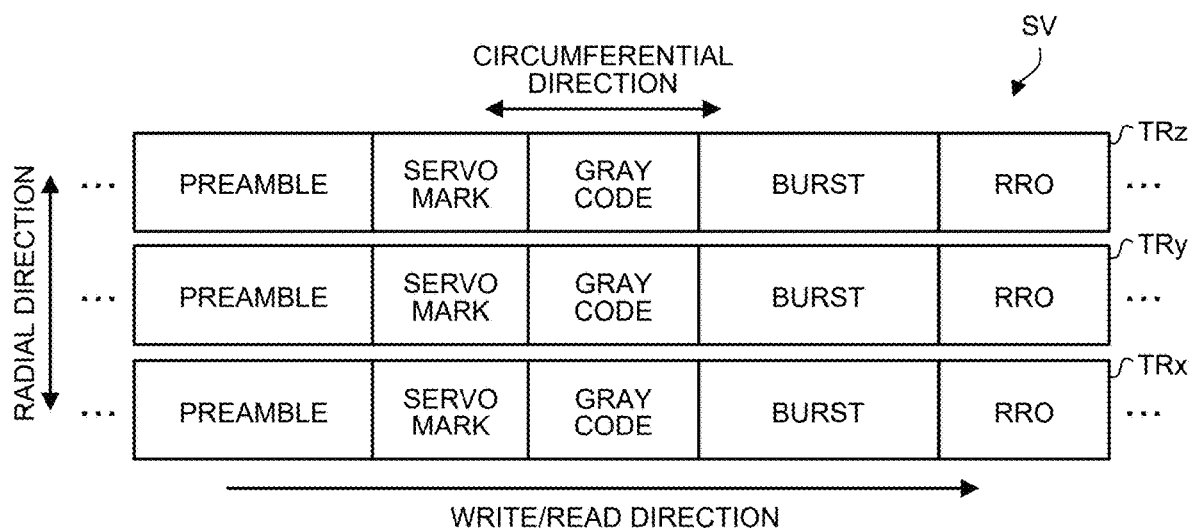
FIG. 3 is a schematic diagram illustrating an example of a servo pattern in which servo data is written to a magnetic disk according to the embodiment.

FIG. 3 is a schematic diagram illustrating an example of a servo pattern SV in which servo data is written to the magnetic disk 10 according to the embodiment. In the example of FIG. 3, it is assumed that the servo patterns SV are provided in the radial direction of the magnetic disk 10 over three tracks of tracks TRx to TRz. Note that servo data and data are written to the magnetic disk 10 by the magnetic head 12 in a circumferential direction of the magnetic disk 10, that is, along each track.

As illustrated in FIG. 3, in the servo pattern SV, a preamble, a servo mark, a gray code, a burst, and a repeatable run out (RRO) code are recorded in this order in a write/read direction, that is, in the circumferential direction of the magnetic disk 10.

The preamble is pattern data of a single period that periodically changes in the circumferential direction. The read head 12R reads a servo waveform, and the R/W channel 40 fetches the read servo waveform as sampling data on the basis of a servo clock. As a result, the preamble is used to adjust the amplitude, phase, and frequency of the sampling data.

The servo mark is pattern data for determining a demodulation timing of the servo data. The MPU 60 determines the demodulation timing of various servo data read by the read head 12R on the basis of the servo mark detection timing thereafter.

The gray code is pattern data including an address for identifying each servo track provided on the magnetic disk 10.

The burst is pattern data used to detect a positional deviation amount of the servo track indicated by the address included in the gray code from a track center and calculate a position error signal required for track tracking.

The RRO code is pattern data in which the correction amount of the RRO is coded. The RRO is a positional deviation repeatedly generated in synchronization with the rotation of the magnetic disk 10. Although the shape of the track is ideal to be a perfect circle, the servo track is distorted due to vibration received at the time of writing the servo data, the servo pattern quality, and the like. Therefore, the radial position of the servo track specified by the burst may deviate from the radial position of the servo track having the ideal shape. Such positional deviation is called RRO since the same amount is repeatedly generated with one rotation of the magnetic disk 10 as a cycle.

The MPU 60 performs correction using the RRO correction amount recorded in the RRO code on the radial position of the magnetic head 12 obtained by reading the burst, thereby obtaining the radial position of the magnetic head 12 in which the positional deviation due to the RRO is canceled.

(Example of Write Operation of RRO Code)

Next, a write operation of the RRO correction amount by the magnetic disk device 1 of the embodiment will be described with reference to FIGS. 4 to 5D.

In the manufacturing process of the magnetic disk device 1, after the gray code, the burst, and the like are written, learning and writing of the RRO correction amount are performed. In the learning of the RRO correction amount, a plurality of tracks are sequentially set as a target track for every tracks in a predetermined range, and a difference between the actual radial position of the magnetic head 12 and the radial position of the target track is measured for each target track under positioning control based on the gray code and the burst.

That is, the MPU 60 reads the gray code and the burst by the read head 12R, and estimates the position of the magnetic head 12 on the basis of the read gray code and burst. In addition, the MPU 60 positions the magnetic head 12 on the target track on the basis of the estimated position of the magnetic head 12. Meanwhile, the MPU 60 acquires a deviation amount of the estimated position of the magnetic head 12 from the target track as the RRO correction amount.

The RRO correction amount learned in this manner is written as an RRO code in the learned track.

As described above, the RRO code is written in the entire servo pattern SV by repeating the learning and writing of the RRO correction amount for every plurality of tracks within the predetermined range. In the magnetic disk device 1 after shipment, a read/write position can be corrected in real time by reading the RRO code in a timely manner.

Note that in the manufacturing process of the magnetic disk device 1 of the embodiment, the data pattern is also written to the target track in parallel with the learning of the RRO correction amount. That is, after the learning and writing of the RRO correction amount are completed for all tracks as described above, the data pattern has been written in the entire writing region of the user data. The data pattern written at the time of learning the RRO correction amount is used in a process called defect scan later.

In the defect scan, the data pattern is read for the entire writing region of the user data. As a result, it is possible to extract a region where a decrease in read output due to a defect or the like of the magnetic disk 10 is recognized. The region where the decrease in the read output is recognized is prohibited from being used by a user.

Figure 4:
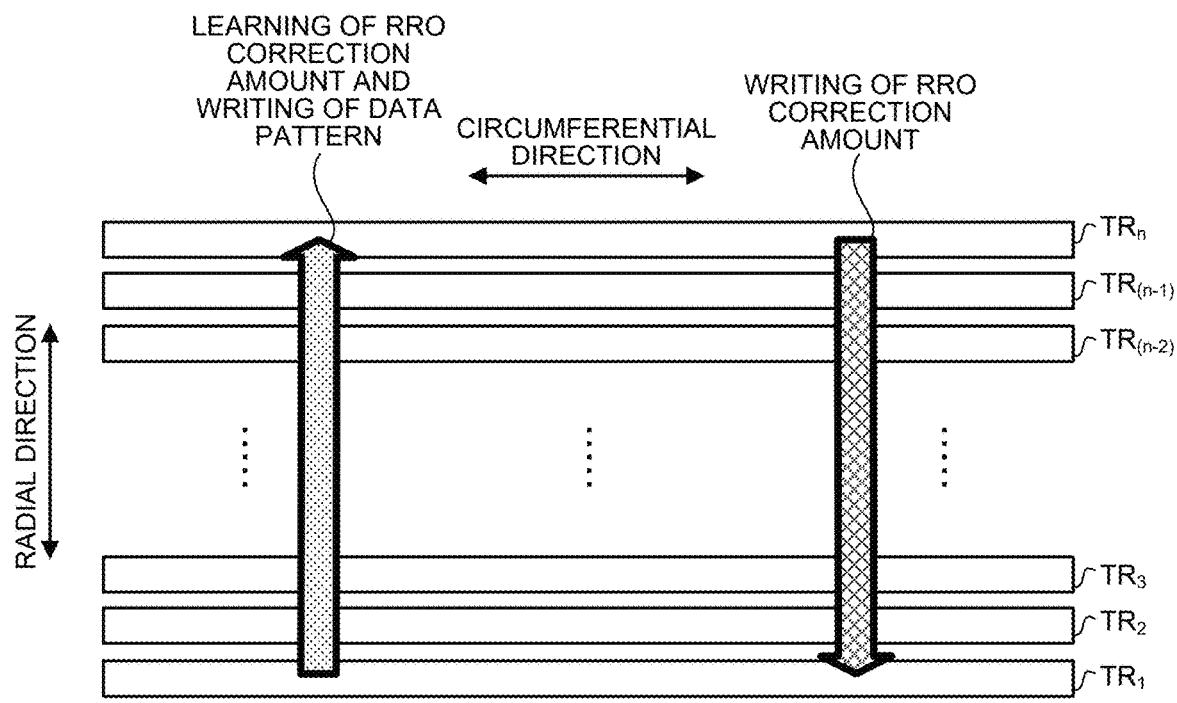
FIG. 4 is a diagram illustrating an example of an operation of learning and writing an RRO correction amount by the magnetic disk device according to the embodiment.

FIG. 4 is a diagram illustrating an example of the operation of learning and writing of the RRO correction amount by the magnetic disk device 1 according to the embodiment. As illustrated in FIG. 4, the magnetic disk device 1 learns the RRO correction amount and writes the learned RRO correction amount for tracks $TR_1$ to $TR_n$ (n is an integer of 6 or more), for example.

More specifically, the magnetic disk device 1 scans the magnetic head 12 from the first track $TR_1$ to the last track $TR_n$, which is one unit of the operation of learning and writing of the RRO correction amount, and learns the RRO correction amount in each of the tracks $TR_1$ to $TR_n$ by the read head 12R of the magnetic head 12. At this time, as described above, the data pattern is written to each of the tracks $TR_1$ to $TR_n$ by the write head 12W of the magnetic head 12.

When the learning of the RRO correction amount and the writing of the data pattern are completed up to the last track $TR_n$, the magnetic disk device 1 scans the magnetic head 12 from the last track $TR_n$ to the first track $TR_1$ in a direction opposite to the direction at the time of learning the RRO correction amount, and writes the learned RRO correction amount to the corresponding tracks $TR_n$ to $TR_1$ by the write head 12W of the magnetic head 12.

Figure 5A:
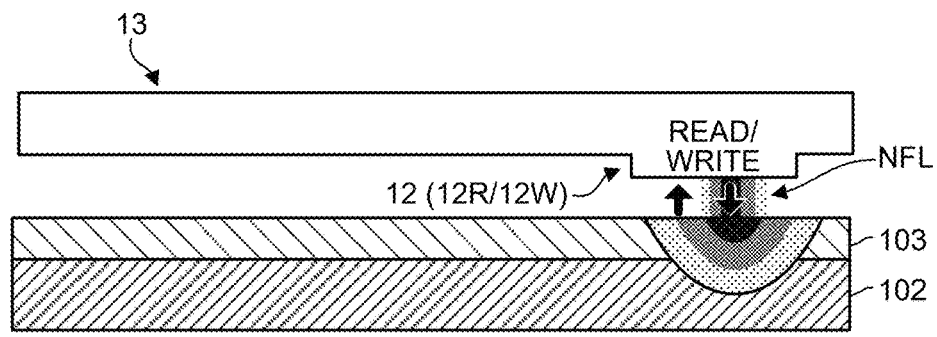
FIGS. 5A to 5D are schematic diagrams illustrating the magnetic head at the time of learning and writing the RRO correction amount by the magnetic disk device according to the embodiment.
Figure 5B:
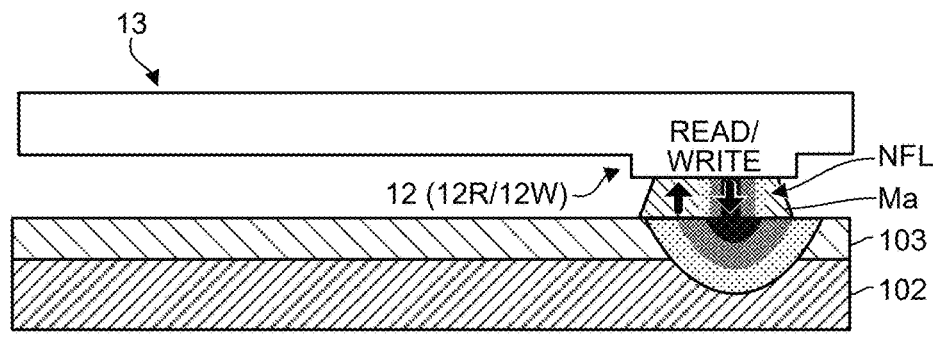
Figure 5C:
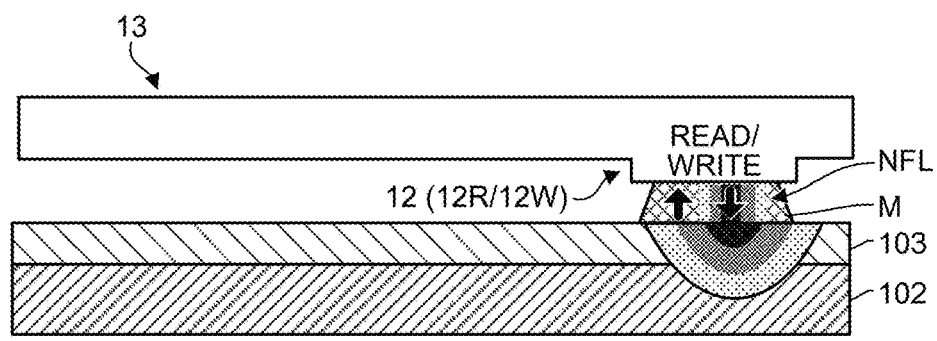
Figure 5D:
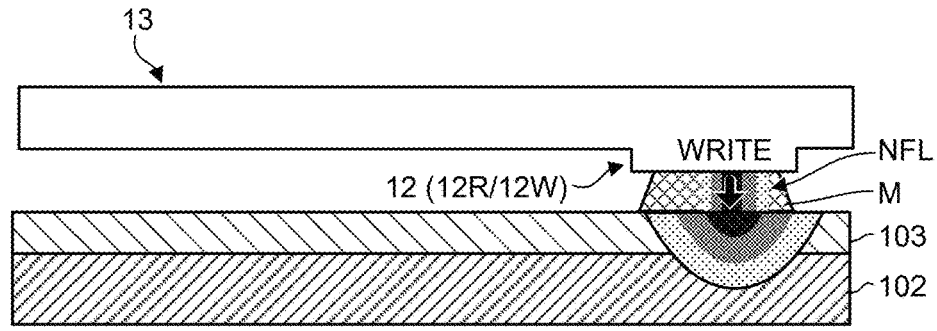

FIGS. 5A to 5D are schematic diagrams illustrating the magnetic head 12 at the time of learning and writing the RRO correction amount by the magnetic disk device 1 according to the embodiment. More specifically, FIGS. 5A to 5C illustrate a state of the magnetic head 12 at the time of learning the RRO correction amount. FIG. 5D illustrates a state of the magnetic head 12 at the time of writing the RRO correction amount.

As illustrated in FIG. 5A, the magnetic head 12 is moved to a start track of learning of the RRO correction amount per one time, and the read head 12R reads the gray code, the burst, and the like of the servo pattern SV to start learning of the RRO correction amount. At this time, in the magnetic disk device 1 of the embodiment, in order to write the data pattern in parallel with the learning of the RRO correction amount, the assist power control unit 162 supplies the assist power to the laser diode 125 (see FIG. 2) to emit the laser light, and the near-field light generation element 127 (see FIG. 2) generates near-field light NFL. Accordingly, a region of the magnetic disk 10 close to the magnetic head 12 is locally heated, and writing of the data pattern by the write head 12W is also started.

As illustrated in FIG. 5B, during writing of the data pattern, the local region of the magnetic disk 10 is heated, so that the lubricant 103 covering the recording layer 102 of the magnetic disk 10 is decomposed and vaporized to adhere to the magnetic head 12. The lubricant 103 is, for example, an organic solvent such as perfluoropolyether (PFPE), and a deposit Ma as described above is accumulated on a surface of the magnetic head 12 facing the magnetic disk 10 as the heating time of the magnetic disk 10 increases. Note that the surface of the magnetic head 12 facing the magnetic disk 10 may be hereinafter also referred to as a lower surface of the magnetic head 12 on the basis of the examples of FIGS. 5A to 5D.

As illustrated in FIG. 5C, the deposit Ma due to the vaporized lubricant 103 is fixed as time passes to become a cured product M. The decomposition product of the lubricant 103 is contained in the deposit Ma, and in addition, $SiO_2$ or the like obtained by oxidizing a Si component contained in the magnetic disk 10 may also contribute to the formation of the deposit Ma. The cured product M obtained by solidification of the deposit Ma is called build-up, smear, or the like, and is formed, for example, over substantially the entire gap from the lower surface of the magnetic head 12 to the outermost surface of the magnetic disk 10.

As described above, during the operation illustrated in FIGS. 5A to 5C, the magnetic disk device 1 of the embodiment learns the RRO correction amount and writes the data pattern by the movement of the magnetic head 12 from the start track to the end track, and urges the formation of the cured product M reaching the outermost surface of the magnetic disk 10 from the lower surface of the magnetic head 12.

Thereafter, the magnetic head 12 having moved to the end track reverses the moving direction and writes the learned RRO correction amount to the corresponding individual track while moving from the final track to the start track.

As illustrated in FIG. 5D, at the position of the final track, the magnetic head 12 starts writing the learned RRO correction amount. Even at the time of writing the RRO correction amount, the assist power control unit 162 supplies the assist power to the laser diode 125, generates near-field light by the near-field light generation element 127, and locally heats the writing region of the magnetic disk 10. As a result, the thermally stable coercive force is temporarily reduced, and the learned RRO correction amount can be written.

Here, it is known that the cured product M formed from the lower surface of the magnetic head 12 to the outermost surface of the magnetic disk 10 improves the transmittance of the near-field light NFL and heat transfer efficiency. Therefore, when the cured product M is fixed to the magnetic head 12, write efficiency and write accuracy by the magnetic head 12 are improved, and an effect of lowering a bit error rate (BER) of data can be expected. As a result, data of the RRO correction amount is written with low BER and high quality.

Note that appropriate values of the flying height of the magnetic head 12 from the surface of the magnetic disk 10 are determined in advance at the time of data reading, the time of data writing, and the time of seeking. However, at the time of learning the RRO correction amount, the flying height of the magnetic head 12 is adjusted not to the flying height at the time of reading but to the flying height at the time of writing. As a result, the cured product M having a size corresponding to the flying height at the time of writing can be formed at the time of RRO learning, and writing of the RRO correction amount can be started in a state where the cured product M reaching the surface of the magnetic disk 10 from the lower surface of the magnetic head 12 is formed. Therefore, it is possible to write the RRO correction amount with high quality from the beginning of start of writing.

However, there is a case where the magnetic disk 10 is not completely flat but locally has slight unevenness. For this reason, a gap between the magnetic head 12 and the magnetic disk 10 may fluctuate during writing of the RRO correction amount, and a slight space may be generated between the cured product M and the surface of the magnetic disk 10.

That is, at the time of writing the RRO correction amount, when the magnetic head 12 moves to a region having a wider gap from the magnetic disk 10 than the height of the cured product M formed during learning of the RRO correction amount, a space is generated between the cured product M and the surface of the magnetic disk 10. In addition, in a region where the gap between the magnetic head 12 and the magnetic disk 10 is narrower than the height of the cured product M, the cured product M formed on the lower surface of the magnetic head 12 wears, and then the magnetic head 12 moves to the region where the gap with the magnetic disk 10 is wide, so that a space may be generated between the cured product M and the surface of the magnetic disk 10.

However, as the heating of the magnetic disk 10 is continued, the cured product M continues to be accumulated even in the writing of the RRO correction amount. For this reason, the space between the cured product M and the surface of the magnetic disk 10, which is generated by minute unevenness or the like of the surface of the magnetic disk 10, is relatively quickly filled with the newly formed cured product M. Therefore, the data writing is maintained with high quality over the entire period of the writing of the RRO correction amount.

In addition, a position on the magnetic disk 10 where the writing of the RRO correction amount is started is the same as a position where the learning of the RRO correction amount is ended. Therefore, the size of the cured product M is large enough to obtain sufficient accuracy in writing, and writing of the RRO correction amount can be started in a state where high-quality data writing is possible.

(Example of Write Processing of RRO Code)

Figure 6:
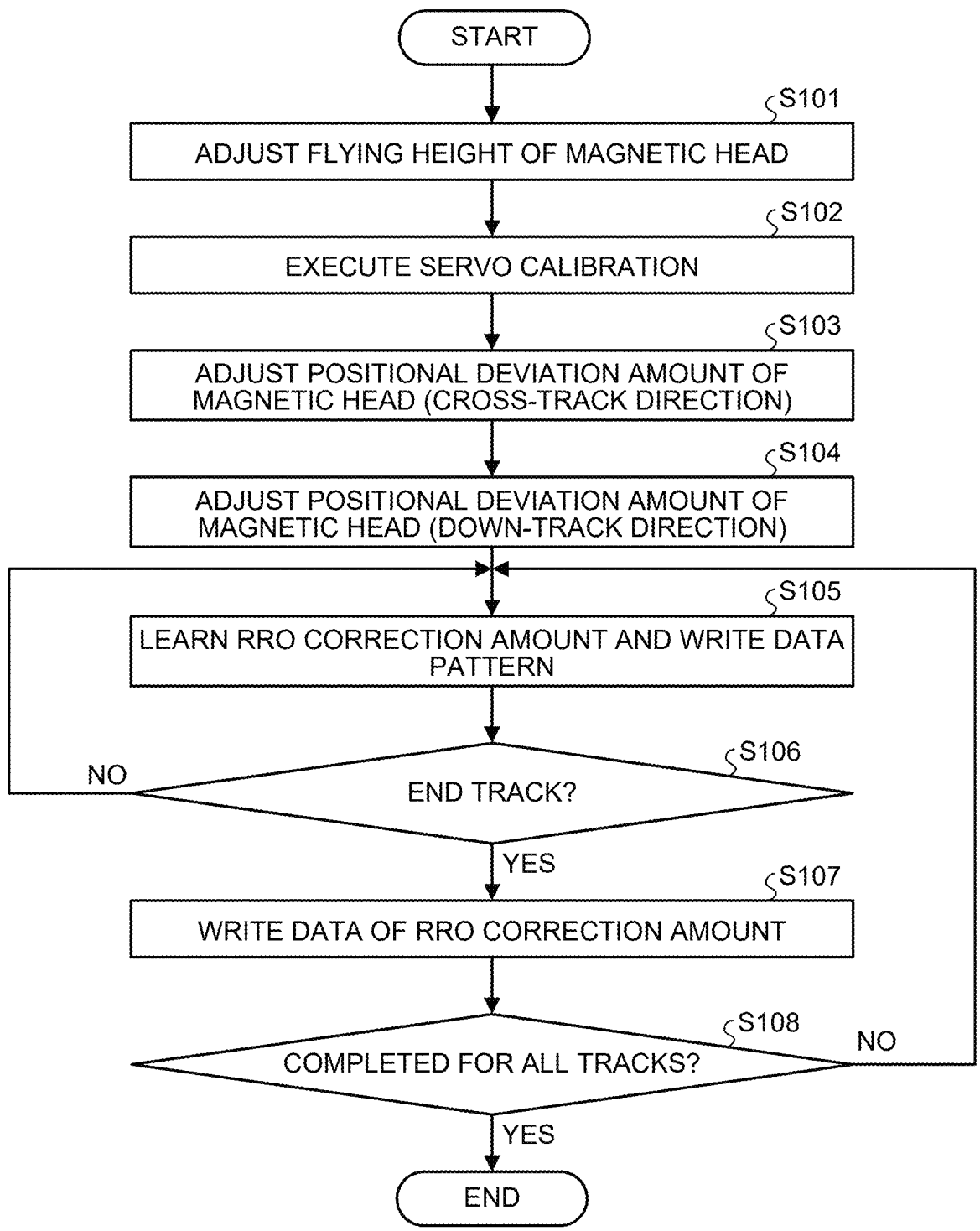
FIG. 6 is a flowchart illustrating an example of a procedure of write processing of an RRO code by the magnetic disk device according to the embodiment.

Next, a write processing example of the RRO code in the magnetic disk device 1 of the embodiment will be described with reference to FIG. 6. FIG. 6 is a flowchart illustrating an example of a procedure of write processing of the RRO code by the magnetic disk device 1 according to the embodiment.

As illustrated in FIG. 6, the MPU 60 of the magnetic disk device 1 adjusts the flying height of the magnetic head 12 with respect to the surface of the magnetic disk 10 so as to be appropriate in the learning of the RRO correction amount and the write processing (Step S101). In addition, the MPU 60 executes servo calibration (Step S102). That is, the MPU 60 optimizes various conditions so as to improve positioning accuracy.

The MPU 60 adjusts a positional deviation amount of the magnetic head 12 in a cross-track direction, that is, in the radial direction of the magnetic disk 10 (Step S103). Similarly, the MPU 60 adjusts the positional deviation amount of the magnetic head 12 in a down-track direction, that is, in the read/write direction of the magnetic disk 10 (Step S104). The positional deviation amount at this time is due to the deviation of a mounting position between the read head 12R and the write head 12W of the magnetic head 12, and in the processing of Steps S103 and S104, a cross-track direction component and a down-track direction component are adjusted with respect to such deviation.

The MPU 60 learns the RRO correction amount of the magnetic head 12 in the start track and writes the data pattern to the start track (Step S105).

That is, the MPU 60 extracts consecutive tracks in a predetermined range in the magnetic disk 10, and performs positioning measurement for a plurality of cycles with respect to the innermost or outermost track in the tracks. This track corresponds to a start track in write processing of one RRO correction amount. The MPU 60 calculates the RRO from the positioning measurement result of each cycle in the start track, and further calculates the RRO correction amount from the calculated RRO. As a result, learning of the RRO correction amount in the start track is performed.

In addition, in parallel with the processing of Step S105, the MPU 60 executes writing of the data pattern by the write head 12W while supplying the assist power to the laser diode 125 to locally heat a target position of the start track.

The MPU 60 executes the processing until reaching the final track. That is, when the learning of the RRO correction amount and the writing of the data pattern are completed for one track, the MPU 60 determines whether or not the track is a track farthest from the start track in the cross-track direction among the consecutive tracks in the predetermined range extracted first, that is, the final track in the plurality of tracks in the predetermined range (Step S106). In a case where the track is not the final track (Step S106: No), the MPU 60 repeats the processing of Step S105 for the next track adjacent in the cross-track direction.

In a case where the track is the final track (Step S106: Yes), the MPU 60 sequentially writes the data of the RRO correction amount obtained by the learning for the predetermined plurality of tracks from the final track to the start track (Step S107).

The MPU 60 executes the processing for all tracks. That is, when the learning and writing of the RRO correction amount for the tracks of the predetermined number of tracks are completed, the MPU 60 determines whether or not the processing is completed for all the tracks included in the magnetic disk 10 (Step S108), and in a case where there is an unprocessed track (Step S108: No), the MPU 60 repeats the processing of Steps S105 to S107 for the tracks of the next predetermined number of tracks. In a case where the processing has been completed for all the tracks (Step S108: Yes), the MPU 60 ends the processing.

As described above, the write processing of the RRO code by the magnetic disk device 1 of the embodiment ends.

COMPARATIVE EXAMPLE

A technique for increasing the bit density of a magnetic disk using a medium having high thermal magnetic stability is known. In this case, there is a case where a heat assist method is used in which at the time of writing, for example, a writing region of the magnetic disk is locally heated using near-field light or the like to temporarily weaken the coercive force of the medium and write data.

In a thermal assist type magnetic disk device, a cured product in which a decomposition product or the like from a magnetic disk is fixed to a magnetic head may be formed by heating the magnetic disk. It is known that such a cured product enhances write accuracy by the magnetic head, and there is a concern that the BER deteriorates in a state where the cured product is not formed or in a state where there is a space between the cured product during formation and the magnetic disk.

In addition, in a manufacturing process of the magnetic disk device, learning of the RRO correction amount and writing of the RRO correction amount, and writing of a data pattern for detecting a defective portion of the magnetic disk are performed on the magnetic disk. The learning and writing of the RRO correction amount are usually performed in parallel in one process, and the writing of the data pattern is usually executed in a separate process from the learning and writing of the RRO correction amount.

In the learning of the RRO correction amount and the writing of the RRO correction amount, the correction amount of the RRO, which is a reproducible positional deviation in which the same amount of positional deviation of the magnetic head repeatedly occurs with respect to the magnetic disk, is learned and written to the magnetic disk. As a result, during actual operation of the magnetic disk device, the RRO correction amount can be read from the magnetic disk to align the magnetic head.

At this time, it is preferable to perform data writing of the RRO correction amount with high quality. Therefore, it is a problem to improve deterioration of the BER due to non-formation, incomplete formation, or the like of a cured product at the beginning of start of writing the RRO correction amount.

According to the magnetic disk device 1 of the embodiment, the data pattern used for detection of the defective portion of the magnetic disk 10 is written by the magnetic head 12 while performing learning of the RRO correction amount and supplying the assist power to the laser diode 125 to heat a learning target portion of the magnetic disk 10. As described above, by writing the data pattern in parallel, the magnetic disk 10 is heated also at the time of learning the RRO correction amount, and a sufficient amount of the cured product M has been formed at the start of writing the RRO correction amount. Therefore, it is possible to write the learned RRO correction amount with higher quality than at the beginning of start of writing.

According to the magnetic disk device 1 of the embodiment, the set value of the flying height of the magnetic head 12 is equal at the time of learning the RRO correction amount and at the time of writing the RRO correction amount. By setting the flying height in this manner, a distance between the magnetic head 12 and the magnetic disk 10 is maintained substantially equal at the time of learning the RRO correction amount and at the time of writing the RRO correction amount, and occurrence of a space between the cured product M formed in the magnetic head 12 at the time of learning the RRO correction amount and the magnetic disk 10 is prevented in writing the RRO correction amount.

According to the magnetic disk device 1 of the embodiment, the moving direction of the magnetic head 12 in the radial direction of the magnetic disk 10 is reversed between the time of learning the RRO correction amount and the time of writing the RRO correction amount.

More specifically, at the time of learning the RRO correction amount, the magnetic head 12 is moved from a track on one end side to a track on the other end side in the radial direction of the magnetic disk 10, and learning of the RRO correction amount in tracks corresponding to a predetermined number of tracks is sequentially executed. In addition, at the time of writing the RRO correction amount, the magnetic head 12 is moved from the track on the other end side to the track on the one end side, and writing of the RRO correction amount to these tracks is sequentially executed.

In a case where the RRO correction amount is learned and the RRO correction amount is written in a manufacturing process of the magnetic disk device, generally, after the RRO correction amount for a predetermined number of tracks is learned, a seek operation is performed to move the magnetic disk to a start track at the beginning of start of learning, then the magnetic disk is moved in the same direction as that at the time of learning the RRO correction amount, and the RRO correction amount is written from the start track to the end track. By adopting such a procedure, it is possible to simply control learning and writing of the RRO correction amount.

However, as in the magnetic disk device 1 of the embodiment, for example, in a case where the cured product M is formed at the time of learning the RRO correction amount, there is a possibility that the formed cured product M is worn due to minute unevenness or the like of the magnetic disk 10 by performing the seek operation between the learning and writing of the RRO correction amount.

As in the above configuration, the moving direction of the magnetic head 12 is reversed between the time of learning the RRO correction amount and the time of writing the RRO correction amount, and the seek operation is not performed between the learning and writing of the RRO correction amount, so that the cured product M formed at the time of learning the RRO correction amount can be prevented from being worn before the start of writing the RRO correction amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device in which data writing is performed by a thermal assist method, the magnetic disk device comprising:
   a magnetic disk to which positional information for each track is written;
   an assist mechanism that heats the magnetic disk;
   a magnetic head that performs data reading and data writing on the magnetic disk; and
   a controller that controls the magnetic disk device, wherein
   the controller is configured to
   cause the magnetic head to read the positional information written to the magnetic disk to learn a correction amount of a positional deviation generated in synchronization with rotation of the magnetic disk,
   in parallel with reading the positional information, cause, while supplying assist power to the assist mechanism to heat a learning target portion of the magnetic disk, the magnetic head to write a data pattern used for detection of a defective portion of the magnetic disk, and
   while supplying the assist power to the assist mechanism to heat a writing target portion of the correction amount of the magnetic disk, cause the magnetic head to write the learned correction amount to the magnetic disk.

2. The magnetic disk device according to claim 1, wherein a set value of a flying height of the magnetic head is equal between at a time of learning the correction amount and at a time of writing the correction amount.

3. The magnetic disk device according to claim 1, wherein the controller is further configured to
   execute learning of the correction amount and writing of the correction amount for every plurality of tracks adjacent to each other in a radial direction of the magnetic disk, and
   reverse a moving direction of the magnetic head in the radial direction at a time of learning the correction amount and at a time of writing the correction amount.

4. The magnetic disk device according to claim 3, wherein the controller is further configured to
   at the time of learning the correction amount, while moving the magnetic head from a first track on one end side to a second track on the other end side in the radial direction in the plurality of tracks, sequentially execute the learning of the correction amount in the plurality of tracks, and
   at the time of writing the correction amount, while moving the magnetic head from the second track to the first track, sequentially execute the writing of the correction amount to the plurality of tracks.

5. A method executed in a magnetic disk device in which data writing is performed by a thermal assist method, the method comprising:
   reading, by a magnetic head, positional information for each track written to a magnetic disk to learn a correction amount of a positional deviation generated in synchronization with rotation of the magnetic disk,
   in parallel with reading the positional information, while supplying assist power to an assist mechanism that heats the magnetic disk to heat a learning target portion of the magnetic disk, writing, by the magnetic head, a data pattern used for detection of a defective portion of the magnetic disk; and
   while supplying the assist power to the assist mechanism to heat a writing target portion of the correction amount of the magnetic disk, writing, by the magnetic head, the learned correction amount to the magnetic disk.

6. The method according to claim 5, wherein
   a set value of a flying height of the magnetic head is equalized between at a time of learning the correction amount and at a time of writing the correction amount.

7. The method according to claim 5, wherein
   the learning of the correction amount and the writing of the correction amount include executing the learning of the correction amount and the writing of the correction amount for every plurality of tracks adjacent to each other in a radial direction of the magnetic disk, and reversing a moving direction of the magnetic head in the radial direction at a time of learning the correction amount and at a time of writing the correction amount.

8. The method according to claim 7, wherein the learning of the correction amount includes while moving the magnetic head from a first track on one end side to a second track on the other end side in the radial direction in the plurality of tracks, sequentially executing the learning of the correction amount in the plurality of tracks, and the writing of the correction amount includes while moving the magnetic head from the second track to the first track, sequentially executing the writing of the correction amount to the plurality of tracks.

\* \* \* \* \*